United States Patent [19]

Way

[11] 3,995,207
[45] Nov. 30, 1976

[54] DIGITALLY CONTROLLED REPETITIVE SCANNING IN A RADIANT ENERGY ANALYZER

[75] Inventor: Allan S. Way, Irvine, Calif.
[73] Assignee: Beckman Instruments, Inc., Fullerton, Calif.
[22] Filed: Nov. 14, 1974
[21] Appl. No.: 523,902

[52] U.S. Cl. .............................. 318/603; 318/282; 318/627; 318/685; 356/97; 318/640
[51] Int. Cl.² ...................... G05B 19/28; G01J 3/42
[58] Field of Search ........... 318/282, 600, 640, 601, 318/603, 685, 691, 626, 627; 356/89, 96, 97

[56] References Cited
UNITED STATES PATENTS

| | | | |
|---|---|---|---|
| 3,280,399 | 10/1966 | Kreinberg | 318/696 |
| 3,455,636 | 7/1969 | Haswell | 356/89 |
| 3,658,422 | 4/1972 | Wilkinson | 356/89 |
| 3,663,106 | 5/1972 | Minami et al. | 356/89 |
| 3,818,261 | 6/1974 | Clarke, Jr. | 318/696 |
| 3,832,062 | 8/1974 | Van Den Bosch | 356/97 |
| 3,843,259 | 10/1974 | Tohyama et al. | 356/97 |
| 3,868,557 | 2/1975 | Scott, Jr. | 318/685 |

Primary Examiner—Gerald P. Tolin
Assistant Examiner—John J. Feldhaus
Attorney, Agent, or Firm—R. J. Steinmeyer; R. R. Meads

[57] ABSTRACT

A spectrophotometer including a wavelength stepper motor driving a wavelength scanning mechanism and a chart stepper motor driving a chart recorder, both motors being operative in response to driving pulses received from a system clock. The upper limit of a wavelength scan interval is established by manually adjusting the wavelength scanning mechanism to the desired limit. The length of a desired scan interval is selected by the operator and loaded into a counter which decrements in response to the driving pulse input to the wavelength motor. The counter generates an output signal after a predetermined count which clocks a switching circuit for reversing, inhibiting, or otherwise controlling the wavelength and chart motors. Other inputs to the switching circuit provide for either serial or overlay chart recording and for either continuous or manually controlled scanning.

10 Claims, 2 Drawing Figures

3,995,207

DIGITALLY CONTROLLED REPETITIVE SCANNING IN A RADIANT ENERGY ANALYZER

BACKGROUND OF THE INVENTION

This invention relates generally to digital motor control systems and, more particularly, to a system for establishing the length of a driven interval of a motor driven mechanism. For example, one use for which the invention is particularly well suited is the control of the drive motor of a wavelength scanning mechanism in a radiant energy analyzer, such as a spectrophotometer, across a wavelength scan interval of a predetermined length.

In presently available radiant energy analyzers, the length of the wavelength scan interval traversed by a motor driven scanning mechanism is most commonly established in analog fashion by presetting first and second potentiometers on the instrument control panel to first and second respective limit voltage levels defining the upper and lower limits of the wavelength scan interval. This approach requires two voltage comparators to compare the two preset voltage levels with a scan position voltage tapped from a variable potentiometer coupled to the scanning mechanism, the scan position voltage level defining the actual position of the scanning mechanism in the scan interval. When the scan position voltage equals either of the two preset limit voltage levels, a scan limit has been reached and the appropriate comparator generates a motor control signal to inhibit, reverse, or otherwise control the wavelength scan motor.

In an analyzer of the above type, a motor driven chart recorder is typically employed to record an optical spectrum for the duration of the wavelength scan interval. The chart drive motor is synchronized with the wavelength drive motor to insure that the recorded spectrum corresponds to the wavelength spectrum actually scanned. It is desirable to increase the versatility in such analyzers to enable an operator to repetitively scan a selected wavelength interval and to record the output waveforms serially on successive portions of the chart recorder paper or, alternatively, to overlay the output waveforms on a single portion of the paper. In the latter case, by overlaying waveforms the change with time of a sample being analyzed can be readily shown, as is often desirable when the sample is undergoing a chemical reaction. In addition to the above, it is further desirable to enable the operator to manually initiate each successive scan or, alternatively, to provide for continuous, repetitive scanning and recording without the need for operator intervention.

Unfortunately, however, analog control of such analyzers is complex and the analog setting of the wavelength scan interval is time consuming and relatively inaccurate. Operator set-up of an analog system is a trial and error procedure which typically involves setting the voltage limits of the scan interval, performing successive trial scans, observing the actual interval scanned during each trial, and adjusting the voltage limits, as necessary, with each trial until the desired scan interval is obtained. As a result, an analog system lacks the accuracy and versatility needed for efficient and rapid set-up and execution of a scanning operation. Moreover, such a system precludes an operator from readily and expeditiously changing the scan limits to operate the system over one or more different scanning intervals.

SUMMARY OF THE INVENTION

Briefly and in general terms, the present invention resides in a new and improved digital system for controlling motor operation in radiant energy analyzers or the like which is easily set up and operated, which is adaptable to multiple operating modes, which provides highly accurate control of a scanning interval, and which achieves its flexibility and versatility in a commercially practical form that is simple in construction and reliable in operation. The system includes means for controlling a driving pulse input to a motor for driving a scan mechanism between the first and second limit positions of the scan interval. The scan interval length is loaded into counting means which counts in response to the motor pulse input and which upon reaching a predetermined count actuates switching means to stop the scan at the second limit position of the scan interval. At the second limit position, the preset scan length is automatically reloaded into the counting means and the motor reverses to drive the scan element toward the first limit position.

Other advantages and aspects of the invention will be apparent from the following detailed description taken in conjunction with the accompanying drawings.

DESCRIPTION OF THE PREFERRED EMBODIMENT

Figure 1:
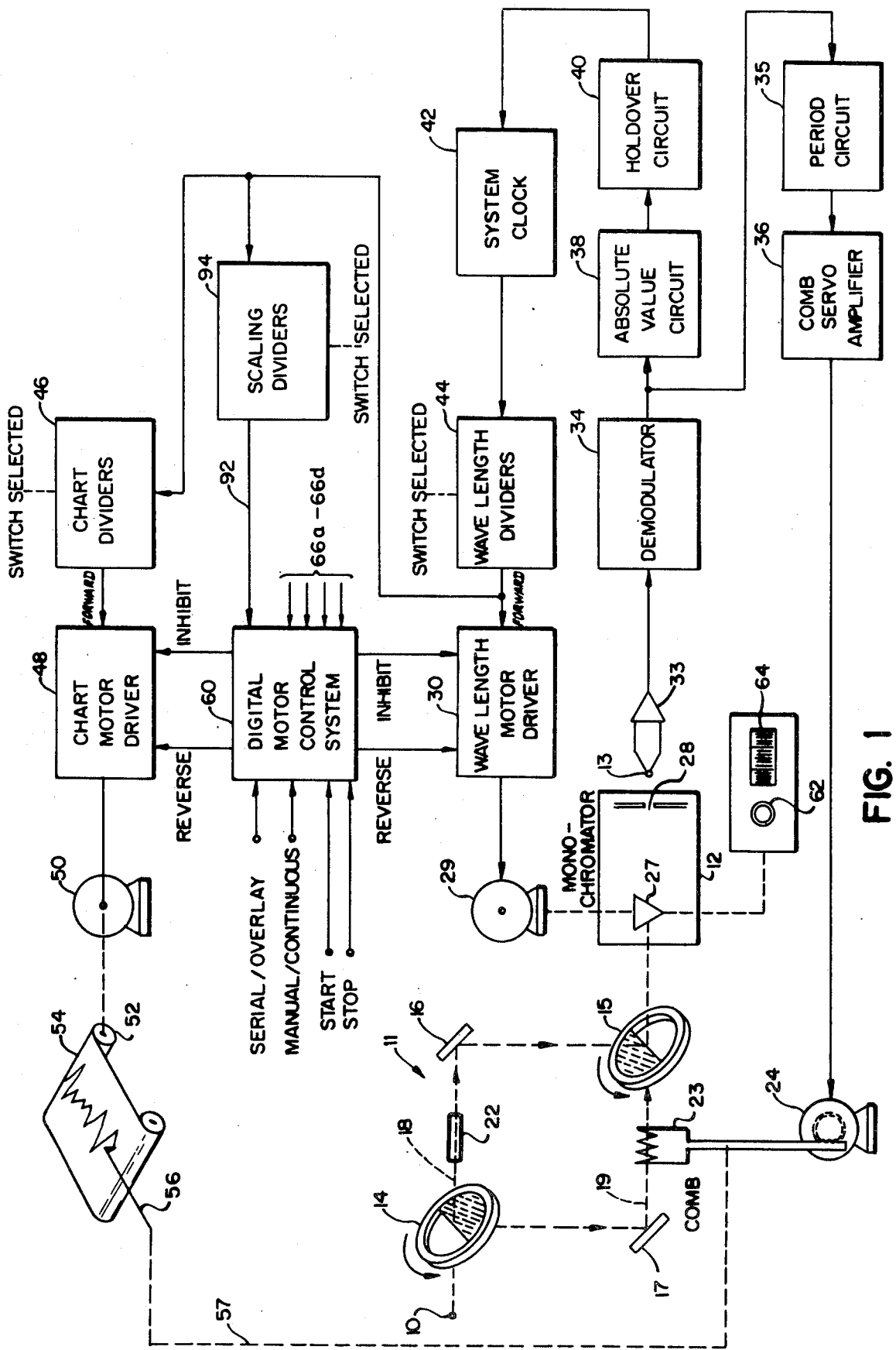
FIG. 1 is a block diagram of a spectrophotometer incorporating the digital motor control system of the present invention.

Referring now to the drawing, and more particularly to FIG. 1 thereof, the present invention is embodied in a spectrophotometer system for analyzing a sample in a sample cell 22 and recording a spectrum of the sample by means of a chart recorder 54. The spectrophotometer is illustrated as a double beam, optical null type and includes a radiation source 10, a beam switching system 11, a monochromator 12, and a thermocouple 13. The source 10 may be any suitable device which produces radiation over the spectrum being analyzed. The beam switching system 11 includes half mirrors 14, 15 which are rotated in synchronism, and reflecting mirrors 16, 17, providing a sample beam path 18 and a reference beam path 19. The sample cell 22 is positioned in the sample beam path 18 and contains the sample to be analyzed. Means for varying the intensity of the beam along the reference beam path 19 is positioned therein. A typical example is comb 23 which is driven into and out of the reference beam path by a motor 24.

Monochromator 12 includes means for dispersing the beam passing therethrough, illustrated as a prism 27, and slit 28 which permits only a small fraction of the dispersed beam to impinge on thermocouple 13. Prism 27 is rotated by a wavelength scan motor 29 during the analysis to scan the entire spectrum of interest past the slit 28. Scan motor 29, as employed in the preferred embodiment, is a frequency responsive motor such as a stepper motor which is rotated by means of discrete digital pulses, and has a speed dependent upon the frequency of the pulses. Motor 29 is energized from a wavelength motor driver 30 which is ordinarily set to operate the motor at a constant rate. A programmed change in scan speed over the spectrum is usually desired and is conventionally accomplished by coupling the motor to the prism 27 or other dispersing element, such as a grating, by means of a cam of appropriate contour. Thermocouple 13 produces an electrical error signal proportional to the difference in intensity of the beams traversing the sample beam path 18 and the reference beam path 19 with the error signal cyclically varying at the beam switching rate, which ordinarily is in the range of 5 to 20 cycles per second. The error signal from thermocouple 13 is connected to an amplifier 36. The output of the amplifier drives the comb motor 24, with the amplifier and motor functioning as the comb servo.

Demodulator 34 is operated in synchronism with the beam switching system 11 and converts the a.c. error signal to d.c. Various types of demodulators may be used with a mechanical chopper preferred at the relatively low frequencies ordinarily encountered in such instruments. Period circuit 35 is a low pass filter that limits the response rate of the comb servo and reduces the sensitivity of the instrument to sharp transients in the error signal such as are ordinarily produced by noise. The time constant of the period circuit is selected as a compromise between the maximum response rate of the comb servo and the acceptable noise level and is typically in the range of 1/4 to 16 seconds. The simplest form of period circuit which is used in many instruments is a resistance capacitance filter section comprising a series resistor and a shunt capacitor.

Scan speed suppression is provided by utilizing an absolute value circuit 38 which produces an output voltage whose magnitude is determined by the absolute value of the error signal. This output is then transmitted to a holdover circuit 40, the output of which controls a voltage controlled oscillator or system clock 42. The output of the system clock 42 is a pulse train, the frequency of which is proportional to the absolute value of the error signal. This output frequency is then divided by switch-selectable wavelength dividers 44 to produce a pulse train at a suitable frequency for the selected scan speed for application to the wavelength motor driver 30 which, in turn, drives the wavelength stepper motor 29. The pulse train output of wavelength dividers 44 is also applied to switch-selectable chart dividers 46 which are connected in cascade with dividers 44. The output pulse train from chart dividers 46, at a suitable selected frequency for the desired chart expansion, is applied to a chart motor driver 48 which, in turn, drives a chart stepper motor 50. The chart stepper motor 50, in turn, drives the take-up reel 52 of the chart paper in recorder 54 which has the sample spectrum graphically reproduced thereon by a suitable marker or pen 56 coupled in a conventional manner to comb 23 as illustrated by dashed line 57. The pen position on the graph ordinate is indicative of the optical characteristic of the sample 22 and the chart movement along the graph abscissa is indicative of wavelength or wavenumber.

In accordance with a primary aspect of the present invention, the spectrophotometer includes a digital motor control system 60, readily set up at an operator control panel, for controlling the length of the wavelength scan. The control system 60 further controls forward, reverse, and inhibit inputs to the wavelength motor driver 30 and the chart motor driver 48 in a manner affording a plurality of operating modes for the spectrophotometer. In this regard, the choice of either manually controlled or continuous scanning is set by a "manual/continuous" input to control system 60, while the choice of serial or continuous recording is set by a "serial/overlay" input. In all operating modes the prism 27 is driven by wavelength drive motor 29 from the upper to the lower limit of the scanning interval after which motor 29 reverses and returns the prism at high speed (slew) to the upper limit. With a "manual" setting, scanning then stops and is not re-initiated until the operator provides a start signal to the control system 60. For a "continuous" setting, the wavelength drive motor continuously drives the prism 27 back and forth between the upper and lower limits of the scanning interval until directed to stop by the operator. For a "serial" setting, each successive wavelength scan, whether executed manually or continuously, is recorded by the chart recorder 54 in serial fashion on successive sections of the chart. On the other hand, for an "overlay" setting, the chart motor 50 is reversed after a scan to return the chart recorder to the original starting point, so that for the next scan cycle the spectrum is recorded on the same section of chart as the previous scan.

The starting wavelength for a desired wavelength scan is manually set by the operator using a control knob 62 to physically adjust the position of prism 27 until the exact starting wavelength is shown on scale 64 visible to the operator. Knob 62 and scale 64 are the same system features utilized to accurately calibrate the spectrophotometer, and, thus, they are employed to accurately set the first limit of the scanning interval.

The desired length of the scan interval is set by the operator using a plurality of switches (identified as 66a–66d in FIG. 1), which may be thumbwheel switches, situated on the operator control panel. The operator adjusts the switches to set the length of the desired scan interval in wavelength or wavenumber units.

Figure 2:
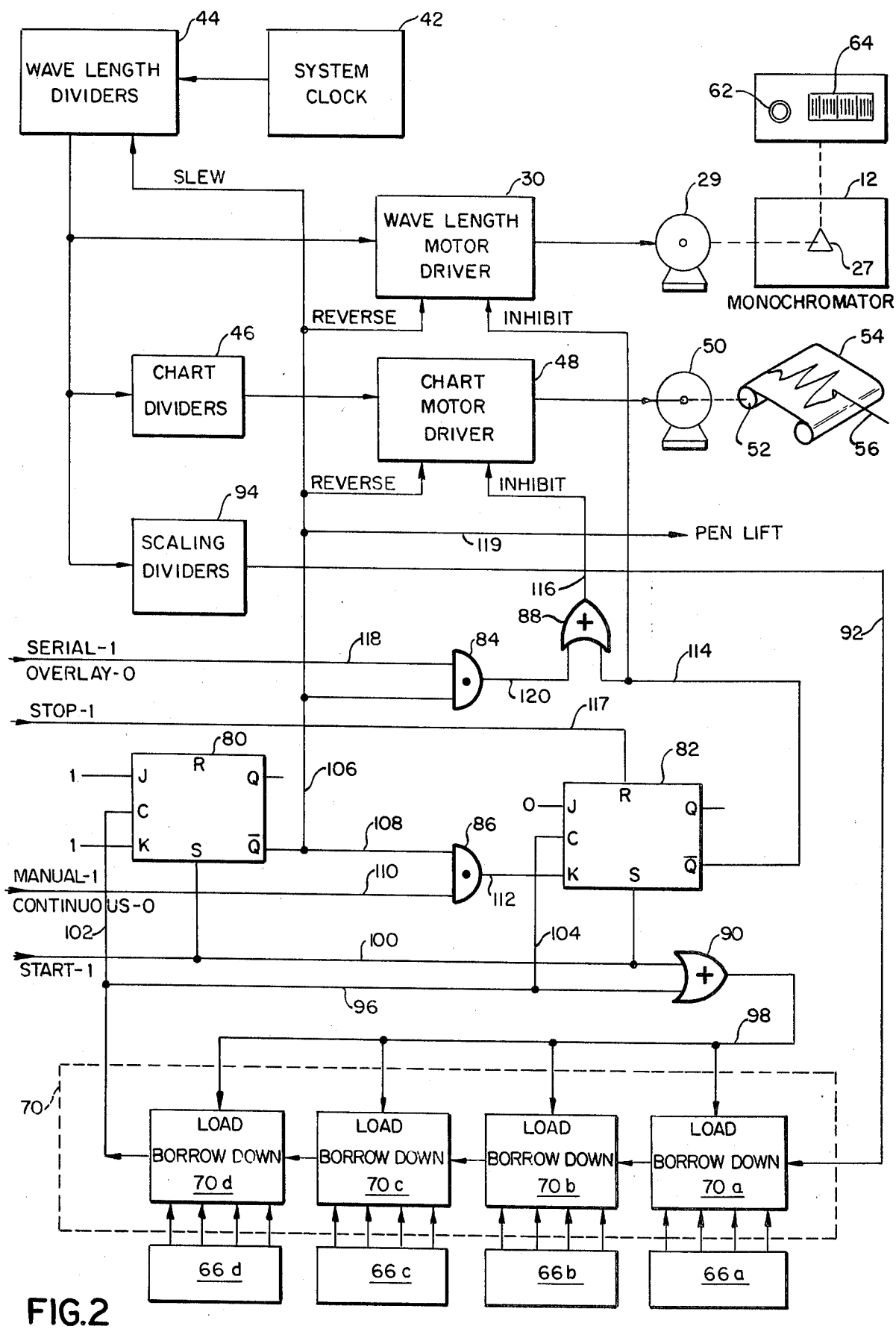
FIG. 2 is a combined block diagram of a portion of the spectrophotometer and schematic of the digital motor control system of FIG. 1.

Referring now to FIG. 2, wherein elements corresponding to those in FIG. 1 have been identified with like reference numerals, the digital motor control system 60 of the invention includes a counting register 70, a first J–K flip-flop 80, a second J–K flip-flop 82, a first AND gate 44, a second AND gate 86, a first OR gate 88, and a second OR gate 90. Counting register 70 is a counter having a plurality of decades 70a, 70b, 70c, and 70d, each of which includes an input (down) terminal, an output (borrow) terminal, and a load control (load) terminal. The decades are connected in serial fashion with the output terminal of each connected to the input terminal of the next succeeding decade. The input terminal of the first decade 70a is connected by line 92 through switch-selectable scaling dividers 94 and wavelength dividers 44 to the system clock 42. The output terminal of the final decade 70d is connected by line 96 to one input terminal of OR gate 90, the output terminal of which is connected over line 98 to the load control terminals of each of the decades 70a–70d of counting register 70.

The J–K flip-flops 80 and 82, respectively, are of conventional design and each include J and K input terminals, Q and $\bar{Q}$ output terminals, a clock terminal C, a set terminal S, and a reset terminal R. Line 100 which receives a high start pulse to initiate system operation is connected to the set terminal of each flip-flop and is also connected to the second input terminal of OR gate 90. The output terminal of the final decade 70d is further connected by line 102 to the clock terminal of the first flip-flop 80 and by line 104 to the clock terminal of the second flip-flop 82.

The J and K input terminals of flip-flop 80 are permanently supplied with a logical true or high level indicated by numeral "1" in the figure. As a result, with high J and K inputs, the first flip-flop 80 functions as a toggle switch, the Q and $\overline{Q}$ output terminals of which change state upon receipt of each pulse at clock terminal C. The $\overline{Q}$ output of flip-flop 80 is connected over line 106 to the "reverse" terminal of both the chart motor driver 48 and wavelength motor driver 30 and, in addition, to the "slew" input terminal of wavelength dividers 44.

The $\overline{Q}$ output of flip-flop 80 is further connected over line 108 to one input terminal of AND gate 86, the other input terminal of which receives over line 110 a "manual" or "continuous" control signal. In the figure, the "manual" signal is illustrated as logically true or high by a numeral 1 while the "continuous" signal is logically false or low as designated by numeral 0.

The J input terminal of the second flip-flop 82 is permanently supplied with a binary false or low level indicated by numeral 0 in the figure. The K input terminal of this flip-flop is connected to the output terminal of AND gate 86. As a result, with a low J input, the operation of flip-flop 82 depends on the K input level thereof. With a low K input, a clock pulse received at clock terminal C has no effect on the Q and $\overline{Q}$ output levels. If the K input is high, however, the clock pulse resets the flip-flop 82 to provide low Q and high $\overline{Q}$ outputs.

The $\overline{Q}$ output from flip-flop 82 is connected by line 114 to the "inhibit" terminal of wavelength motor driver 30 and to the first input terminal of OR gate 88, the output terminal of which is connected to the inhibit terminal of chart motor driver 48.

The reset terminal R of flip-flop 82 is connected over line 117 to receive a high "stop" signal to stop system operation upon actuation by the operator of a control panel stop switch (not shown). Resetting flip-flop 82 forces the $\overline{Q}$ output thereof high to supply an inhibit signal to motor drivers 30 and 48 to inhibit both motors 29 and 50.

A serial or overlay control signal is directed over line 118 to the first input terminal of AND gate 84, the second input terminal of which is connected by line 106 to the $\overline{Q}$ output of flip-flop 80, and the output terminal of which is connected by line 120 to the second input terminal of OR gate 88. In the figure, the serial control is illustrated as logically true or high by a numeral 1, while the overlay signal is logically false or low as designated by numeral 0.

Prior to beginning a scanning operation, the operator manually adjusts the monochromator prism 27 using knob 62 to set the initial or upper limit of the spectrum interval to be scanned in the manner previously described. Thumbwheel switches 66a–66d are adjusted by the operator to set the length of the interval to be scanned. In addition the operator selects the chart recording mode as either serial or overlay and the scanning as either manual or continuous by setting switches (not shown) to supply the necessary high or low voltage levels to conductors 110 and 118. To begin operation, the operator presses a start button (not shown) to supply a high start signal over line 100 through OR gate 90 to the load control terminals of decades 70a–70d to load the value set by the thumbwheel switches 66a–66d into the corresponding decades of the counting register 70. The start signal is additionally coupled to the set input terminals of flip-flops 80 and 82 to set the Q output of each flip-flop high and set the $\overline{Q}$ output of each flip-flop low. The set input to the flip-flops overrides any other inputs thereto. With the $\overline{Q}$ outputs of each flip-flop initially low, the motors 29 and 50 will be driven in the forward scanning direction by the system clock since the "reverse" and "inhibit" input terminals to each of drivers 30 and 48 are necessarily low.

The pulse output of the wavelength dividers 44, which is coupled to the scan and chart motors 29 and 50, is also coupled through scaling dividers 94 over line 92 to provide one pulse per unit wavelength input to the first decade 70a of the counting register 70. The first decade 70a decrements one count per unit wavelength in a conventional manner and upon reaching a zero level generates a borrow pulse at its output terminal which is coupled to the input terminal of the next succeeding decade 70b. The register counts down in this manner until the digits of all decades are zero at which time the wavelength drive motor has driven prism 27 to the lower limit to the wavelength scan interval.

When the counting register 70 has decremented to zero, the next input pulse to the register causes the final decade 70d to generate a borrow or output pulse which is applied over respective lines 102 and 104 to the clock input terminals of both flip-flops 80 and 82, and which is additionally applied over conductors 96 and 98 to the load terminals of decades 70a–70d. As a result, the output pulse from the counting register 70 clocks both flip-flops and additionally reloads the data set by thumbwheel switches 66a–66d into the decades of the counting register a second time.

With permanent high inputs at the J and K terminals of flip-flop 80, the clock pulse applied to this flip-flop from counting register 70 toggles the Q and $\overline{Q}$ output terminals, so that Q switches from high to low and $\overline{Q}$ switches from low to high. When $\overline{Q}$ goes high, the "reverse" input terminals to wavelength driver motor 30 and the "slew" input terminal of wavelength dividers 44 go high to reverse the drive of wavelength motor 29 to return prism 27 in a high speed fashion to the initial or upper limit of the scanning interval. The slew signal effectively reduces the divide ratio of dividers 44 to increase the return speed of the motor. Similarly, the reverse input to chart motor driver 48 is driven high to reverse the chart drive unless the chart drive is otherwise inhibited. It will be noted at this point that for serial recording, the high serial input on line 118 combined with the high $\overline{Q}$ output from flip-flop 80 on line 106 provides a high output through AND gate 84 and OR gate 88 to the "inhibit" terminal of chart motor driver 48 to prevent reversal of chart drive motor 50.

For overlay recording, the low overlay signal on line 118 prevents the inhibit terminal of chart motor driver 48 from going high. As a result, the high reverse signal on line 106 prevails and the chart is driven in the reverse direction. At such time a "pen lift" signal is fed from line 106 over line 119 to means (not shown) for lifting pen 56 from the chart paper during the reverse chart movement. Actual scanning and recording occurs only during the forward motion of motors 29 and 50.

As the wavelength motor 29 is driven in the reverse direction, the scan length which had been reloaded in the counting register 70 is again decremented one count per unit wavelength until all digits in the register reach zero, at which time the prism 27 has been returned to its initial or upper limit position. A borrow pulse is again generated at the output terminal of decade 70d which clocks both flip-flops 80 and 82 and reloads the thumbwheel switch values into the counting register a third time.

When flip-flop 80 is clocked, the $\overline{Q}$ output is switched low which removes the reverse drive signal coupled to motor drivers 30 and 48 over line 106. The motors will then be inhibited if manual operation is selected or will automatically begin a new scan cycle if continuous operation is selected. This choice of operating modes is controlled by second flip-flop 82 upon receipt of the clock pulse from register 70. The effect of the clock pulse on flip-flop 82 will depend upon the value at the K input terminal of the flip-flop when the clock pulse is received.

If continuous operation is selected, the low level on line 110 assures a low level at the K input of flip-flop 82, in which case, with both J and K input terminals low, the clock has no effect on the flip-flop output. $\overline{Q}$ thus remains low thereby coupling a low level to the inhibit terminals of wavelength motor drivers 30. As a result, motor 29 is not inhibited, and the system scans continuously until the operator intervenes. If, however, manual operation has been selected to couple a high level on lines 110 and 108 through AND gate 86 to the K input terminal of flip-flop 82, the clock pulse then resets the flip-flop 82 to provide a low Q and a high $\overline{Q}$ output. When $\overline{Q}$ goes high, a high signal is applied over lines 114 and 116 to inhibit both the wavelength and the chart motor drivers 30 and 48, respectively. As a result, the system stops at the initial or upper limit position to await another start signal from the operator.

From the foregoing it will be evident that the present invention provides a novel digital control system for accurately controlling the scan interval in radiant energy analyzers or the like in the manner which affords simple operator set-up and control together with the flexibility of plural operating modes for tailoring the scanning and recording operations to the needs of each particular of analyses made. Moreover, it will be evident that while a specific embodiment of the invention has been illustrated and described, various changes and modifications may be made therein without departing from the spirit and scope of the invention.

I claim as my invention:

1. In a radiant energy analyzer for deriving an optical characteristic of a sample positioned in a radiant energy beam path, the analyzer including a monochromator in the beam path having an optical element for dispersing the radiant energy, a wavelength drive motor and associated wavelength motor drive circuit, the wavelength motor coupled to the optical element for varying the wavelength of the dispersed radiant energy between first and second limit positions of a desired scan interval, a clock source for supplying a pulse input to the wavelength motor drive circuit for driving the wavelength motor and hence the optical element over the desired scan interval, the improvement comprising: digital control means for controlling the pulse input to the wavelength motor drive circuit to supply a predetermined number of pulses thereto for driving the optical element over the scan interval in a forward direction from the first to the second limit positions thereof to execute a scanning operation and in a reverse direction back to the first limit position, the control means including counting means for monitoring the pulse input to the wavelength motor drive circuit and for generating an output signal in response to a prescribed pulse count corresponding to each limit position of the desired scan interval, and logic means responsive to the output signals from the counting means for establishing a forward or reverse drive direction for the wavelength motor, whereby the radiant energy analyzer is conditioned to perform repetitive scanning operations.

2. The radiant energy analyzer of claim 1 wherein the logic means further includes means for inhibiting the wavelength motor after return to the first limit position and operator controllable means for initiating the next scanning operation.

3. The combination of claim 1 wherein the counting means includes a register having an input terminal connected to monitor the pulse input to the wavelength motor drive circuit and an output terminal for supplying the output signal in response to the prescribed pulse count corresponding to a limit position of the desired scan interval, and the logic means includes first switching means having a clock terminal connected to the output terminal of the counting means for receiving the output signal therefrom, an output terminal connected to the wavelength motor drive circuit for supplying a signal thereto establishing the direction of movement of the wavelength motor, and a set terminal responsive to a start signal for setting the signal at the first switching means output terminal at a first value establishing forward drive of the wavelength drive motor.

4. The combination of claim 3 including means accessible to an operator for setting a numeral value defining the length of the scan interval, load control means associated with the counter means and responsive to the start signal for loading the numerical value into the counting means, and wherein the output terminal of the counting means is connected to the load control means thereof for reloading the numerical value into the counting means in response to each output signal from the counting means.

5. The combination of claim 3 wherein the logic means further includes a second switching means having a clock terminal connected to the output terminal of the counting means, an output terminal connected to the wavelength motor drive circuit for supplying a signal thereto for inhibiting movement of the wavelength motor, and a set terminal responsive to the start signal for setting the signal at the second switching means output terminal at a value which does not inhibit the wavelength motor, the second switching means further having an input terminal connected to the output terminal of the first switching means.

6. The combination of claim 5 further including recording means for recording on a recording medium the optical characteristic of the sample within the scan interval, a recorder drive motor and associated recorder motor drive circuit for driving the recording means in response to a pulse input from the clock source, and wherein said control means further controls the pulse input to the recorder motor drive circuit and the direction of recorder drive to record the optical characteristics of the sample derived for repetitively scanned intervals either serially on successive sections of the recording medium or overlaid on the same section of the recording medium.

7. The combination of claim 6 wherein the clock source is connected to the wavelength motor drive circuit through a set of selectable wavelength frequency dividers and is connected to the recorder drive motor through the wavelength frequency dividers and a set of selectable chart frequency dividers in series therewith, and wherein the input terminal of the counting means is connected through a set of selectable scaling frequency dividers to a common point between the series connected wavelength dividers and chart dividers to receive a pulse input corresponding to one pulse per unit wavelength or wavenumber of the desired scan interval, whereby an operator sets the numeral value defining the length of the desired scan in corresponding unit wavelengths or wavenumbers for loading into the counting means.

8. The combination of claim 7 wherein the first and second switches are first and second J–K flip-flops, respectively, the first flip-flop having logical high input levels supplied to the J and K terminals thereof, and the second flip-flop having a logical low input level supplied to the J terminal thereof, the output terminal of each switch being the $\overline{Q}$ terminal thereof and wherein the $\overline{Q}$ terminal of the first flip-flop is coupled to the K terminal of the second flip-flop.

9. The radiant energy analyzer of claim 3 wherein the first switching means responds to the output signal from the counting means and applied to the clock terminal thereof to switch the signal at the first switching means output terminal between the first value establishing forward drive of the wavelength motor and a second value establishing reverse drive of the wavelength motor and vice versa.

10. The radiant energy analyzer of claim 5 wherein the second switching means responds to the output signal from the counting means and applied to the clock terminal thereof to switch the signal at the second switching means output terminal to a value inhibiting the wavelength motor after return to the first limit position thereof, and the logic means includes operator controllable means for initiating the next scanning operation.

* * * * *